April 26, 1966  J. A. LAWLER  3,247,701
METHOD AND APPARATUS FOR CORRECTING CALIBRATION ERRORS
Filed Jan. 31, 1964
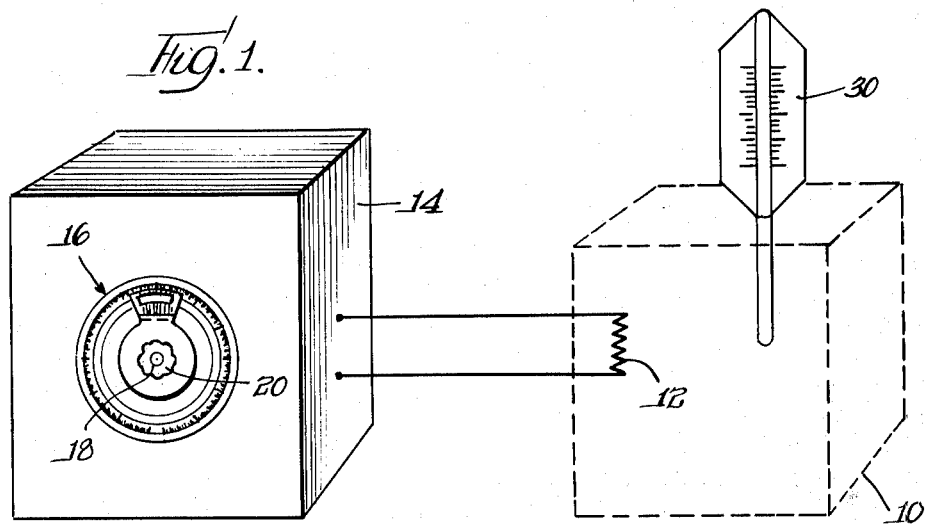
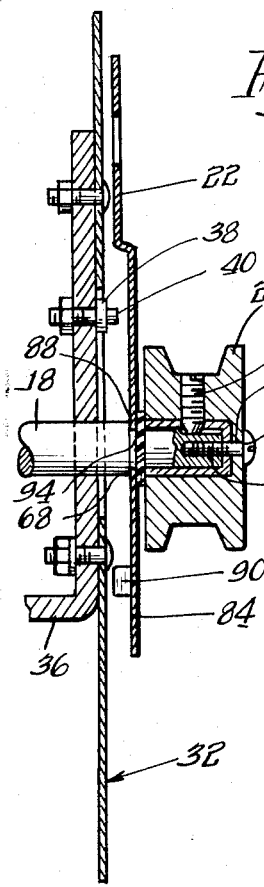
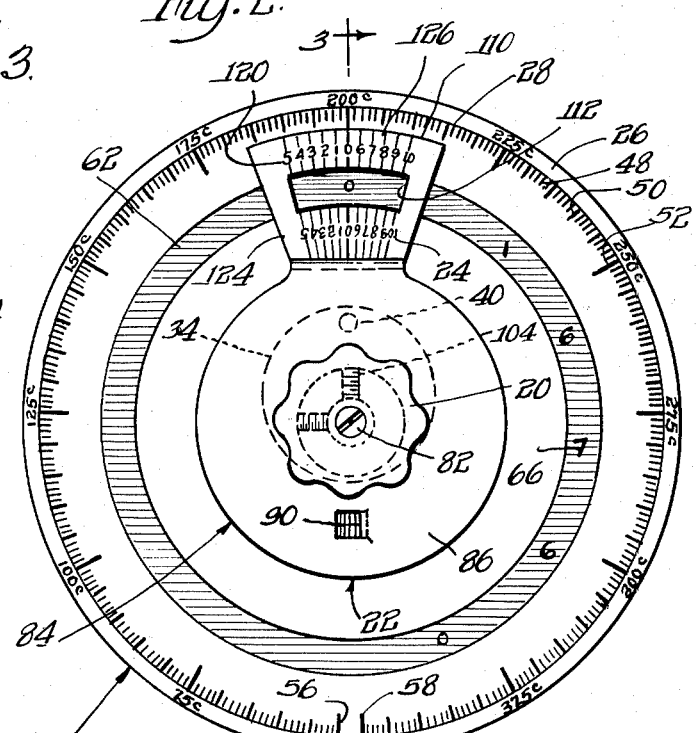
INVENTOR.
Joseph A. Lawler
BY: Stone, Nierman
Burmeister & Zimmer
Attys.

United States Patent Office 3,247,701
Patented Apr. 26, 1966

3,247,701
METHOD AND APPARATUS FOR CORRECTING CALIBRATION ERRORS
Joseph A. Lawler, Chicago Heights, Ill., assignor to Blue M Electric Company, Blue Island, Ill., a corporation of Illinois
Filed Jan. 31, 1964, Ser. No. 341,529
10 Claims. (Cl. 73—1)

This invention relates to a method and apparatus for correcting calibration errors in devices employing scales and pointers for fixing or measuring variable parameters, such as numerically calibrated manually operated knobs or dials, or calibrated measuring instruments. More particularly, the invention relates to a method for obtaining a high-accuracy calibrated visual reading of exact parameter values from a mass-produced device which has calibration markings, as manufactured, which are merely approximately accurate, and to an indicator construction for carrying out the method.

It is of course everyday knowledge that there are many types of devices incorporating scale-and-pointer indicators of parameters such as temperature, voltage, frequency, etc. which cannot be made fully accurate in low-cost mass production because of the slight variations in construction from unit to unit which inhere in the reasonable tolerances necessary to low production costs. Thus it is fairly common to manufacture such devices with nominally calibrated dials bearing numerical value indicia which accurately represent the true values of the parameters indicated only for what may be called the "design average," while individual units are rarely if every accurately calibrated as so manufactured. Sometimes, in such a commercial product, particularly in electrical devices, an adjustment of some kind is provided for making the dial or scale read correctly at mid-range, or some similar point, leaving the balance of the scale to such plus-and-minus variation as may occur from one unit to the next, normally causing errors of many scale divisions at some points in the range.

In many applications, such errors are of course of no consequence. However, frequently electrical instruments or devices so produced are of types which are highly stable and capable of close and accurate individual calibration. Also, in some cases, devices which may not be fully stable against a large variety of ambient conditions, may nevertheless produce fully reproducible settings or readings under fixed conditions of use. Accordingly users who desire high accuracy but do not desire to purchase the much more costly accurately factory-calibrated type of instrument or device frequently can obtain, in practical effect, the same results by individually calibrating a lower-cost crudely calibrated version against some standard of known accuracy. In general, this has been done by making calibration charts or graphs from which actual values may be read, or from which the "plus" or "minus" correction may be read, or in some similar manner. The making of an entirely new scale, with main divisions or marker lines bearing numerical indications (normally at intervals of 5 or 10 or 25, etc. units) and subsidiary marker lines for interpolation, is difficult or impossible, particularly where, as is commonly the case, the displacement of the knob, indicating needle, etc., is not constant per unit change of the parameter varied or measured over the entire range of the device, i.e., where the relative movement between the scale and the pointer or other provision for reading the scale is not a linear function of the parameter set or measured by the movement. The non-uniformity of spacings between individually adjacent marks generally makes construction of a whole new scale a prohibitively difficult operation, so separate calibration graphs or charts, or schemes involving addition to, and subtraction from, numerical values as indicated on the erroneously calibrated scale are commonly employed.

The present invention was conceived, and will later be described, in connection with the manufacture of a controlled-temperature furnace, in which a knob or similar adjusting device is used for setting the temperature, a suitable scale calibrated in temperature values being associated with the adjusting device; however, the invention will be seen to be applicable to many other types of equipment.

In the present device, all of the markings of the standard mass-produced approximate scale are used, including the numerical parameter values, the errors being corrected by effectively advancing or retarding the usual reading index pointer or marker in the various regions of the overall range. To accomplish this most simply, the present invention employs a number of spaced index markers instead of the conventional single index marker (normally a pointer or hairline indicator) and each index marker is designated by a reference number or similar identifying designation. A reference identification associated with each region of the dial scale identifies the index marker which for that region is used for accurate reading or setting of parameter values.

Use of a number of index markers and corresponding reference identifications effectively obtains the same advantages as the relatively complicated operation of using calibration charts, or adding or subtracting correction figures, but involves no effort beyond using as the "pointer" the appropriate index marker designated for each region (including regions where no actual error appears).

More complete understanding of the invention will best be obtained from the description of the embodiments thereof illustrated in the drawing and described below in accordance with the patent laws.

In the drawing:

FIGURE 1 is a highly diagrammatic showing of a controlled-temperature heating system, including a temperature-setting knob-and-dial assembly made in accordance with the invention;

FIGURE 2 is a front elevational view of the knob-and-dial assembly of the system of FIGURE 1; and FIGURE 3 is a cross sectional view taken along line 3—3 of FIGURE 2.

FIGURE 1 shows in highly diagrammatic form a system of equipment comprising a furnace 10 having a heating element 12 which is coupled to a temperature control unit 14 having a control dial assembly 16 shown in greater detail in FIGURES 2 and 3. Temperature within the furnace is a function of the rotational position of a control shaft 18 which is linked to the internal mechanism (not shown) of the control unit 14 operated by a control knob 20. The latter carries and positions a rotatable wide indicator arm 22 having spaced index markers 24 (each usable as a "pointer" for setting of the dial as later set forth) over a stationary calibrated scale 26 whose markings 28 cover the range of the temperatures to which the settings can be made. A thermometer 30, illustrated in FIGURE 1, is used in a preliminary calibration operation to measure and indicate the values of the temperature within the furnace 10 corresponding to the positions of the indicator arm in all desired regions.

The stationary scale member of the dial assembly 16 is a thin circular metal plate 32, having a large eccentric aperture 34, secured to the front panel 36 of the control unit. A stud 38 mounted on panel 36 has a forwardly extending stop-pin portion 40.

The scale 26 is made up of markings 28 of the usual line-mark type, the shortest 48 representing increments of one degree, those of medium length 50 representing increments of five degrees, and the longest 52 representing increments of twenty-five degrees. The scale 26 is almost, but not completely, circular, the extreme markings 56 and 58 being, respectively, the minimum and the maximum scale indicia. The temperature scale 26 is in actuality non-linear, the rotation corresponding to a given temperature difference being substantially greater in the high range than in the low range (not readily apparent in the drawing, which is simplified in this respect).

The plate 32 also bears an annular band 62 concentrically within the scale 26. The band 62 has a roughened surface adapted to receive pencil or ball-point pen writing, here indicated as numbers 66, the surface being produced, for example, by application of a suitable paint.

The control shaft 18 which extends outwardly from the plate 32 has a shoulder 68 and the end of the shaft has at its center a threaded bore 80 which receives a screw 82.

The indicator or rotating member 84 of the dial assembly 16 is formed from a unitary thin metal plate and comprises a generally circular central portion 86 of a diameter somewhat smaller than that of band 62 and an indicator arm 22 extending radially therefrom in a plane offset rearwardly from the plane of the central portion. The central portion 86 has at its center an aperture 88 passing the reduced end portion of the shaft 18, and accordingly abuts against the shaft shoulder 68. A small rectangular tab 90 is bent rearwardly from the circular portion 86, engaging the stop-pin 40 to fix the limits of rotation in both directions.

Between the knob 20 and the front surface of the rotating indicator member 84 is a "star" lock-washer 94. The knob 20 has a central aperture 102 passing the axial screw 82 and has radial set screws 104.

Upon the loosening of the set screws 104, the axial screw 82 may then be loosened to unlock the rotational position of the indicator 84 with respect to the shaft and permit adjustment of this position; thereupon retightening of the screw 82 locks the indicator 84 in rotational position with respect to the knob, and tightening of the set screws 104 establishes the fixed relative position of the parts of the rotating assembly.

The outermost edge 110 of the indicator arm 22 is, unlike the usual "pointer," an arc of substantial angular extension, the radial length of the indicator arm 22 being similar, however, to that of a conventional pointer, i.e., extending to a radius adapted for observation of angular position in terms of the numerical scale markings.

An arcuate window 112, approximately the radial width of the band 62, is punched out of the indicator arm 22. As the arm rotates, the window sweeps over and exposes the band 62 and the reference numbers 66 inscribed thereon.

Permanently inscribed on the face of the indicator arm 22 are uniformly spaced index lines or markers 24 which extend radially for the length of the arm (with a gap at the window) and terminate at the arcuate edge 110. Each index marker has a corresponding identifying reference index number 120 designated by the reference numerals "0" through "10" (these numbers, however, being mere arbitrary reference indicia, so that letters, colors, etc. would serve equally well). The index portion of the indicator arm thus differs from the conventional pointer or single hairline indicator, to which the center marker, here designated as "0," roughly corresponds. Each index number 120, which designates a corresponding index marker 24, is permanently inscribed on the outer part 122 of the arm 22 upright (in the illustrated position of the arm) and on the inner part 124 of the arm 22 inverted (in this position), the latter of course being upright to facilitate the identification when the arm is directed generally downwardly.

In use, the index markers 24 on each side of the center index marker (the "0" index) are used as "correction pointers" in those regions of the scale in which the scale values indicated by the settings would otherwise be inaccurate, the marker producing the error-free reading in each part of the range being written (or otherwise recorded) in a preliminary calibration operation, so that no calculation or similar operation is required beyond following such direction to the appropriate corrected reading; indeed the operation of calibration is itself free of calculations and correction figures.

Typically, the arm 22 is first adjusted in position on the shaft, so that the center index marker "0" is aligned with the "200 degree" or midscale marking on the scale 26 with the temperature set at 200 degrees as indicated on the thermometer 30, this operation corresponding to the one-point setting conventional with the usual single pointer. The "0" index number (or other center designation) is then written on the band 62 within the window, and serves to indicate that readings in this region of the scale are to be made with the index marker so identified. The balance of the scale (or the portions to be used by the particular purchaser) is calibrated in similar fashion. For example, if the temperature is varied to bring the thermometer 30 to 225 degrees after reaching of equilibrium, and it is observed that the index marker designated by "1" aligned with the scale marking of this temperature, this identification is marked on the portion of the band exposed in the window. Obviously, the number of calibration points chosen and indicated as desired by the user. Likewise, depending on the requirements of the user, interpolation may be indicated by, for example, a marking such as "6½."

It will be observed that the illustrated embodiment employs a construction specifically designed and constructed for the present method. However, there are certain constructions of knob-and-dial assemblies heretofore used for other purposes which are suitable for the present method. For example, the method may be used with a knob-and-dial assembly of the type having a principal or main index marker and a plurality of supplementary markers provided for purposes of interpolation, i.e., reading of fractional or decimal portion of the distance between the smallest divisions on a linear scale. Such vernier devices are well known, being commercially available for use with high-precision instruments of various types, but in a totally different manner than that of the present invention, the reading actually being taken, in the previous manner of use, with the principal index marker, and the auxiliary vernier markers being used to determine the fractional reading of the principal marker in cases where it falls between the smallest divisions of the scale. The present invention may be utilized with "stock" dials and knobs of such a construction, although designed for this different purpose, by simply disregarding this original purpose and employing all the index markers in the manner described above, recording the identification of the one to be used in each portion of the range. Although such recording is desirably made on the calibrated scale itself, at the appropriate region to be directly indicated by the index assembly (by exposure through the window in the illustrated embodiment), it will be seen that less advantageous utilizations of the method may be achieved by recording the marker identifications for the various portions of the scale elsewhere.

A large number of other variations will be found, many of which will be obvious. For example, adaptation to straightline, rather than circular, scales, and to devices for metering, rather than setting, parameter values, and other manners of advancing or retarding the reading-point with respect to the portion of the device (movable or fixed) which carries the reading-index, without calculation or similar operations, will easily be devised. Other variations will become apparent to those skilled in the art only after study.

Accordingly, the scope of the patent protection to be given the invention should not be limited to the particular embodiment herein described, but should be determined only in terms of the descriptions in the appended claims, and equivalents thereof.

What is claimed is:

1. A method of producing an accurate calibrated visual readout of exact parameter values in apparatus wherein such parameter values correspond to relative positions of fixed and movable members comprising:
   (a) applying to one of said members a set of spaced visual index markings,
   (b) applying to the other of said members a scale having visual calibration markings registerable with successive index markings upon relative motion, said calibration markings bearing numbered indications approximately directly representative of corresponding parameter values,
   (c) producing known values of the parameter by relative position of the scale and index, and
   (d) applying to at least one of said members visual identification of the respective index marks registering with the calibration markings correctly representative of parameter values in various regions of the scale.

2. The method of claim 1 characterized by
   (e) each said visual identification being applied to the portion of the scale to which it refers.

3. A method of calibrating a device of the type having a scale calibrated in terms of a parameter and an index assembly movable with respect to the scale to produce visual indication of a parameter value, comprising the steps of:
   (a) producing a plurality of known values of the parameter and the corresponding relative positions of the scale and index assembly, and
   (b) producing identifications of the respective portions of the index assembly along the direction of extension of the scale which register with the respective values of the parameter on the scale so known, such identifications serving to indicate the portions of the index assembly to be used in subsequent readings of the device on the respective portions of the scale.

4. The method of claim 3 wherein such identifications are on the portions of the scale to which they are applicable, the index assembly portion appropriate for reading each portion of the scale being itself indicated by the position of the index assembly.

5. Scale-and-index apparatus for reading of parameters varying in correspondence with relative position of the scale and index comprising:
   (a) a scale having markers representative of numerical indications of successive values of the parameter,
   (b) an index member having a plurality of index markers successively registering with scale markers with relative motion of the scale and index, and
   (c) means for producing on the scale identifications of the respective index members which register with the correct scale marker in respective portions of the overall range of the scale.

6. The apparatus of claim 5 characterized by
   (d) the scale having a band portion next to the portion bearing the markers adapted for the writing thereon of such identifications adjacent to the markers in each portion of the range.

7. For use in a temperature-control system, a calibrated control assembly comprising:
   (a) a temperature-controlling shaft,
   (b) a housing bearing the shaft, the temperature being fixed in accordance with rotational position thereof,
   (c) a circular temperature-marked scale on the housing surrounding the shaft and having an annular band thereon adapted for inscription of identification indicia, and
   (d) an index assembly on the shaft having a plurality of angularly spaced radial markers on the outer edge, each identified by different visual indicia, and a window overlying the annular band and adapted for the inscription and reading of indicia on the band.

8. A temperature-control system comprising, a combination with the control assembly of claim 7, means responsive to position of the shaft to vary a temperature, the band having thereon the indicia of the index markers registering with the correct temperature values on the scale in the respective positions of the index assembly in which the window overlies and exposes each of the indicia.

9. A parameter-indicating device comprising:
   (a) a scale-and-index assembly including a scale marked in numerical values of a parameter and an index member, the relative positions whereof correspond to values of a parameter,
   (b) the index member having thereon indexing means adapted for reading of relative position of the index member and the scale by register with the markings of the scale at a plurality of locations on the index member, and
   (c) means for producing indicia indicative of the place on the index member which registers with the correct scale marking in the various respective portions of the range of parameter values covered by the scale.

10. The device of claim 9 wherein the indicia-producing means include a surface on the scale adapted for the written copying of indicia permanently inscribed on the index member identifying such respective locations thereon.

References Cited by the Examiner

UNITED STATES PATENTS 2,992,552  7/1961  Jaquith _____ 73—1
3,109,411  12/1963  Fuhrman _____ 116—133 X DAVID SCHONBERG, *Acting Primary Examiner.*